United States Patent [19]

James et al.

[11] Patent Number: 5,406,290

[45] Date of Patent: Apr. 11, 1995

[54] HIT VERIFICATION TECHNIQUE

[75] Inventors: Jesse C. James, Huntsville; James B. Blackmon, Jr., Brownsboro, both of Ala.

[73] Assignee: McDonnell Douglas Corporation, St. Louis, Mo.

[21] Appl. No.: 236,337

[22] Filed: May 2, 1994

[51] Int. Cl.6 .................... G01S 13/56; G01S 13/06
[52] U.S. Cl. ................... 342/119; 342/138; 342/176
[58] Field of Search ............ 342/119, 125, 133, 146, 342/176, 68, 138

[56] References Cited

U.S. PATENT DOCUMENTS

| | | | |
|---|---|---|---|
| 3,706,136 | 12/1972 | Sielaff | 342/176 X |
| 3,949,955 | 4/1976 | Sykes et al. | 342/62 X |
| 4,057,708 | 11/1977 | Greeley et al. | 342/58 X |
| 4,160,250 | 7/1979 | Butler et al. | 342/105 |
| 4,224,621 | 9/1980 | Cornett et al. | 342/183 |
| 4,739,329 | 4/1988 | Ward et al. | 342/119 |
| 5,014,062 | 5/1991 | Schriner et al. | 342/68 |

Primary Examiner—John B. Sotomayor
Attorney, Agent, or Firm—Ronald M. Goldman; John P. Scholl

[57] ABSTRACT

An interceptor's point of impact on a targeted missile is quickly revealed in the milliseconds preceeding and following the impact by illuminating the target with radar signals at a high pulse repetition rate and observing the reflected radar echoes on an A-scope display. The position within the returned radar echo of a double echo and related changing phenomenon indicates the point of impact. Failing intercept, the miss distance is computed from the relative slant ranges to the targeted missile, the interceptor, and the double echo. The type warhead killed is revealed by a spectrograph slaved to the radar's antenna. Various techniques assist with the interpretation of the displayed patterns, including subtraction of previously stored patterns and display of the difference, display of characteristic patterns of various known missiles and interceptors stored in "look up" tables, and neural networks.

27 Claims, 10 Drawing Sheets

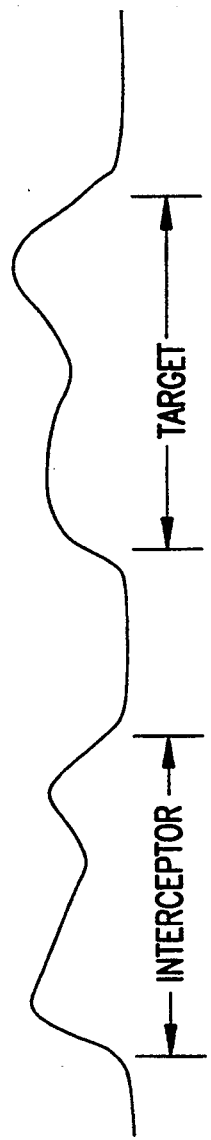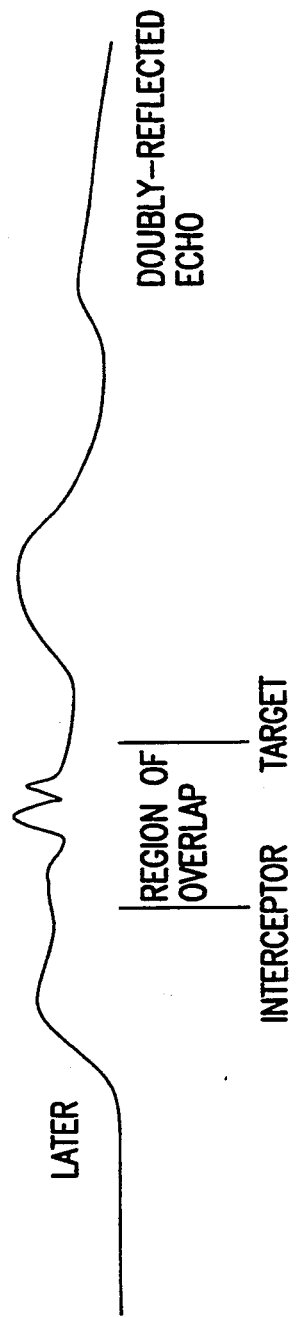

PULSE# N-2

PULSE# N-1

PULSE# N

TIME OF IMPACT

PULSE# N+1

HIT VERIFICATION TECHNIQUE

FIELD OF THE INVENTION

This invention relates to a method of remotely observing the point of collision between two radar reflective bodies and determining the nature of that collision or, should the bodies avoid colliding, the miss distance. More particularly, the invention relates to a process and apparatus for verifying that an interceptor hit a targeted missile.

BACKGROUND

Conventional radars can often determine whether or not an interceptor missile hits an incoming missile, which, posing a threat, was targeted for destruction. That radar cannot determine whether or not the targeted missile was effectively destroyed or killed, cannot determine the point on the target that was hit, cannot reveal the type of warhead carried by the missile, and cannot determine the miss distance should the interceptor fail to collide with the targeted missile. In many cases it is important to have that information; to know what type of warhead was being carried by the targeted missile and to know if that warhead was destroyed. The experience gained by firing of Patriot missiles at incoming Scud missiles, as occurred during the recent Persian Gulf War and reported upon in the press, demonstrates that striking the Scud at the aft end does not destroy live warheads carried on the missile's fore end and that something more must be done to end the threat.

Thus in conducting war, intercepted targets must be assessed to determine whether the target has been rendered harmless or remains alive. At present such assessments are made by a radar evaluation of the remains following an intercept. Radar cross-section measurements, coupled with optical measurements of the debris, assist in the kill assessment. Intercepted objects are assessed by examining their trajectory perturbation, impact flash and size of the largest piece of debris. If the debris contains only small pieces, no one of which is large enough to constitute a threat, the interception is assessed as a kill. If, however, a large enough piece remains and its trajectory is still threatening, it may be assessed as a non-kill and another interceptor launched to destroy that large piece. Such technique requires time for further tracking and study, and is subject to error. The present invention, as an advantage, permits assessment of the intercept without requiring acquisition and tracking of large debris.

The opposite side of the coin to collision detection is collision avoidance. The congested skies in and around major airports lead often to hazardous flight conditions. In both military and civilian aircraft, proximity warning systems are in use that alert the aircraft that it is on a collision course with a nearby plane, so that the planes may change course. Not all planes carry such collision avoidance systems. Even so, none of the present systems appear to allow the flight controller to remotely assess the miss distance in a near miss situation. They appear to rely on the pilot's potential visual observation of that miss distance. As an advantage, the present invention provides a tool that promptly warns air controllers of dangerous flight conditions as well as assessing miss distances between aircraft; a valuable safety tool to enhance the safety of air travel.

An object of the novel process is to provide a quick and effective assessment of the interception of a targeted missile.

Another object of the invention is to provide an effective measurement technique for determining the location on the missile struck by an interceptor and/or the miss distance if the missile is not struck and to determine the type of warhead that was destroyed.

A further object of the invention is to verify that an incoming missile has been intercepted and rendered ineffective.

And a related object of the invention is to enhance the safety of the air lanes in and about airports; to provide a means to alert air controllers of an impending collision between aircraft and an assessment of the miss distance.

SUMMARY OF THE INVENTION

The interceptor's point of impact on the target missile is quickly revealed in the milliseconds preceding and following an impact by illuminating the target with radar signals of a high pulse repetition rate and observing the returned signal on an A-scope display, depicting returned radar echo as against time or range, to determine the position within the returned radar signals of a double echo and related changing characteristic radar phenomenon occurring at the point of impact on the target. By subtracting prior A-scope patterns from succeeding patterns, the presence of separate reflective bodies illuminated by the radar signals is more prominently displayed. Where no collision occurs, the miss distance may be determined from the additional radar delay time as a pulse travels from the radar to the first target, then to the second target, then back to the radar.

Conversely, by observing the changes in spacing between any two craft that are not intended to collide, but which may be closing on one another inadvertently, such as two airplanes, suitable proximity warning may be given by the air controller to avoid a collision as well as to more accurately determine the miss distance.

As an additional feature, a spectroscope tracks the targets concurrently with the radar to detect the spectral lines associated with the flash of any collision between interceptor and target. From those detected spectral lines, the type warhead carried by the target is identified.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the Drawings:

FIG. 5 illustrates a special case of interference waveforms produced by two targets at approximately the same radar range, wherein a double radar echo appears later in delay time;

DESCRIPTION OF THE PREFERRED EMBODIMENTS

Figure 1:
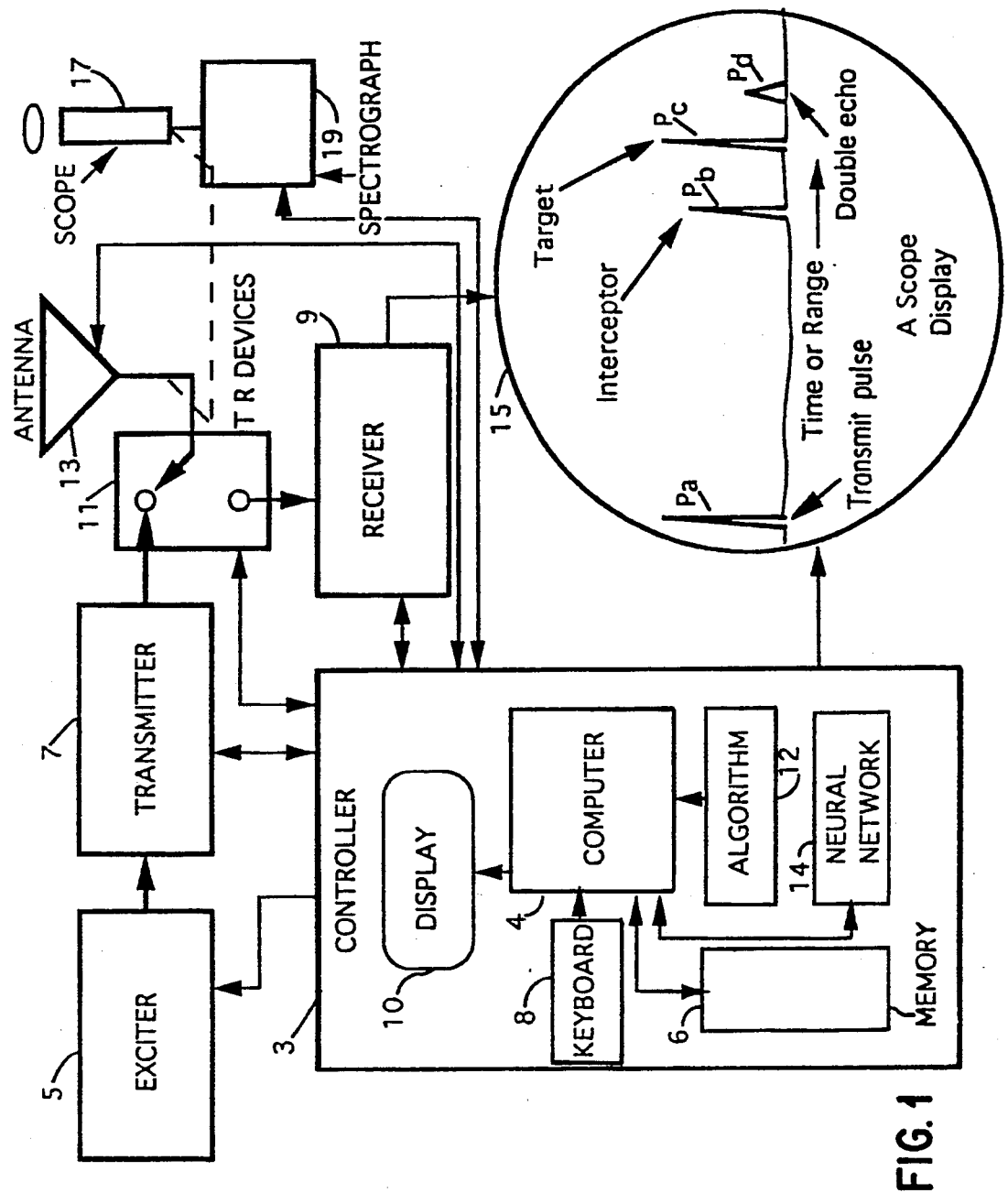
FIG. 1 is a block diagram of a radar system incorporating the invention for carrying out the novel method.

Reference is made to FIG. 1 which presents the radar system combination in block diagram form. The radar is a known type of radar which includes controller 3, exciter 5, transmitter 7, radar receiver 9, TR switch 11, antenna 13 and A-scope 15. The radar has dual modes of operation. It may be switched by the controller from operation in a tracking mode to operation in an intercept mode. Conventional radars of this type have the capability of detecting differences in range of a foot or less from great distances.

As described in greater detail hereafter, in the preferred embodiment, controller 3 includes not only the conventional circuits for controlling operation of the radar but additional functions for the processing of the received echoes in accordance with the preferred embodiment described. This includes a computer 4, memory 6, a local keyboard 8, display/alarm 10, program algorithms 12 and, for automating operation of the system, a neural network program 14. The system may contain additional A-scope displays, not illustrated.

A telescope 17 provides output to a spectroscope 19. Antenna 13 scans, either by rotation or other movement, under control of controller 3, to look for targets. The telescope is mechanically linked to the antenna, as indicated by the dash line, and moves with the antenna. It views visible images from the same field of view scanned by the antenna.

Briefly speaking, under control of controller 3, the radar repetitively emits pulses of RF power from the antenna, 13, and that RF propagates into space, while the TR switch, 11, prevents that transmitted power from entering the associated receiver 9. After each pulse is transmitted the transmitter is returned to a quiescent state, and the TR switch operates, connecting the antenna to the receiver. The receiver listens for a return echo, which may be of the principal polarized channel, and the cross polarized channel. When incident upon an RF reflecting body, such as the surfaces of an aircraft or missile, a portion of the incident RF is reflected back to the same antenna or, in another embodiment, to another separate antenna during such interpulse period and is input to the receiver. The receiver receives and processes each reflected pulse, including displaying the image of the echoed RF pulse on the A-scope, 15. Further, the radar is dual mode. It can be switched from a tracking mode, in which one or more targets are tracked, to an intercept mode in which it is switched to higher power output and a higher pulse repetition rate. The foregoing elements are known in the radar art and, hence, need not be described in detail. A suitable radar for this system emits radar pulses in the tracking mode typically at a frequency of 10 GHz at typical pulse repetition rates of 100 pps and power levels of 1 Megawatt, and, in the intercept mode, at a frequency of 10 GHz at a pulse repetition rate of between 10,000 to 40,000 pulses per second and has a pulse width on the order of ten microseconds, and a bandwidth of between 100 MHz and 400 MHz.

As depicted in the A-scope display 15, Pa represents the transmitted RF pulse, and received echoes Pb and Pc represent an echo from a first body, suitably the interceptor, and a second body, suitably the incoming missile, as example. The weaker echo Pd represents a double echo; a signal that traveled to each of the two bodies then to the other body then back to the radar. The distance between Pa and Pb on the scope is a measure of the distance from the radar's location and the interceptor, a distance which lengthens as the interceptor continues to travel away from the radar site toward the missile. The distance between Pb and Pc is a measure of the component of the distance between the interceptor and the missile in the direction of the radar. Since the interceptor and missile are traveling toward one another, closing, that distance decreases. Pulses Pb, Pc and Pd will ultimately appear to merge in position on the A-scope, provided there is a hit. The distance from the interceptor to the incoming missile is twice the range or distance Pd minus the distance Pb minus the distance Pc.

Electromagnetic waves transmitted by the radar are polarized. Radars usually transmit a certain polarization, such as left circular. The more sophisticated radars, such as used in the present embodiment, receive both polarizations because the relative amounts of energy in each polarization reveals certain information about the target. The principal channel is right circular for a radar that transmits left circular, and vice versa for a radar transmitting RF signals having right circular polarization. The doubly-reflected pulse, Pd, will normally be stronger in the cross-polarization receiving channel than in the principal-polarization channel. Consequently, the circuit that searches for Pd preferably searches both polarization channels.

Controller 3 includes a computer 4, a digital processor, which continuously computes the separation between target and interceptor, in terms of time or range, at each instance when echo pulses are received during the tracking and during the intercept mode. It determines the range of Pb; determines the range of Pc, and subtracts the two ranges to create a difference, the slant-range intercraft distance. Furthermore, when the slant-range distance is small, the radar's computer continually solves for the true separation of bodies, S, using the algorithm or formula, $S = 2Rd - (Rb + Rc)$, where Rd is the radar range to the double echo, and Rb and Rc are the radar ranges to the two targets. If the slant-range or the true separation is such that an intercept may occur in less than one second of time, the controller immediately switches the radar into the intercept mode.

Theoretically that timing difference can be made as small as ten milliseconds, before the radar switches modes. Although the foregoing time differences may seem difficult to comprehend in terms of one's human senses, those time periods are quite lengthy in terms of present radar technology. As example, a defense type radar has an operating frequency of 10 GHz, pulses of 10 microseconds and a pulse repetition rate of 30,000 pulses per second in the intercept mode. Once switched into the intercept mode, the radar remains in that mode until about one second after an intercept or after miss.

Figure 2:
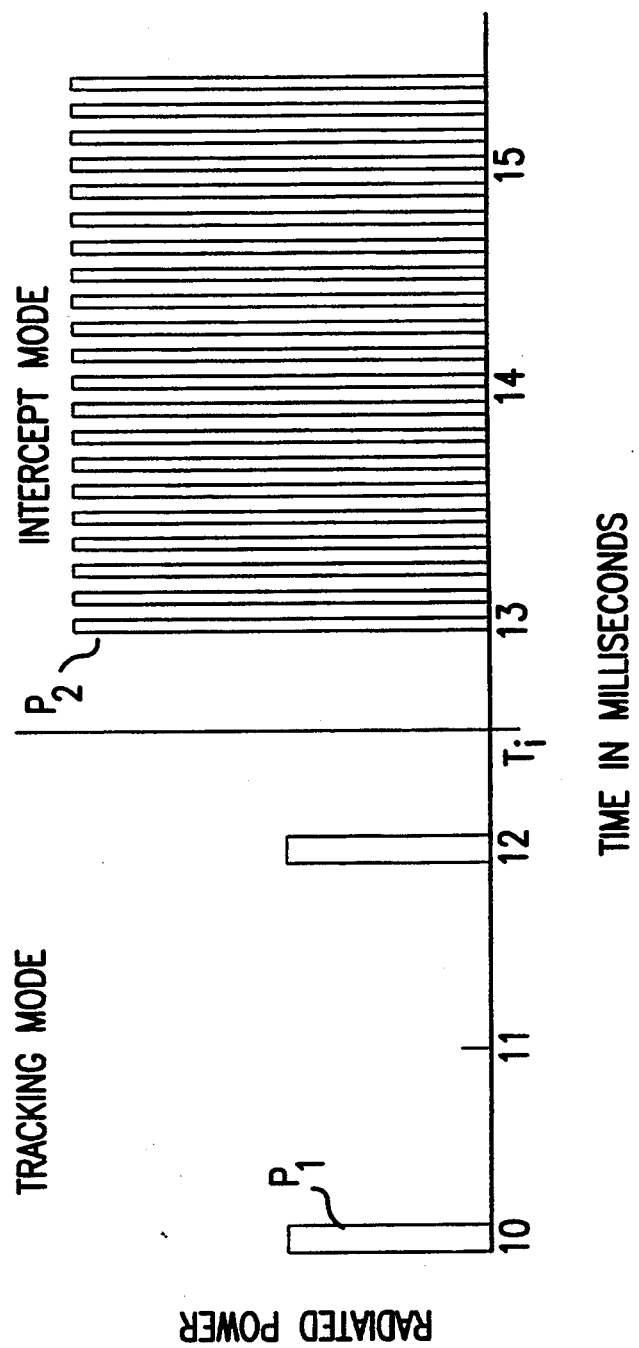
FIG. 2 graphically illustrates radar pulses in both the tracking and intercept modes as occurs in the embodiment of FIG. 1.

When in the intercept mode, the transmitted waveform of the RF is changed to a broadband pulse, and the transmitted power and the pulse repetition rate are increased. In FIG. 2 a portion of the radar's pulsed RF power output is represented graphically with the peak pulse power level represented by the ordinate and time by the abscissa. As illustrated, the RF pulses emitted by the radar are widely spaced during the tracking mode, that is, they occur at a lower pulse repetition rate, as represented by pulses P1. When the radar switches into the intercept mode, as at time Ti, at the 12.5 milliseconds location along the abscissa, the peak power and the repetition rate increase substantially, as represented by pulse P2.

Figure 3:
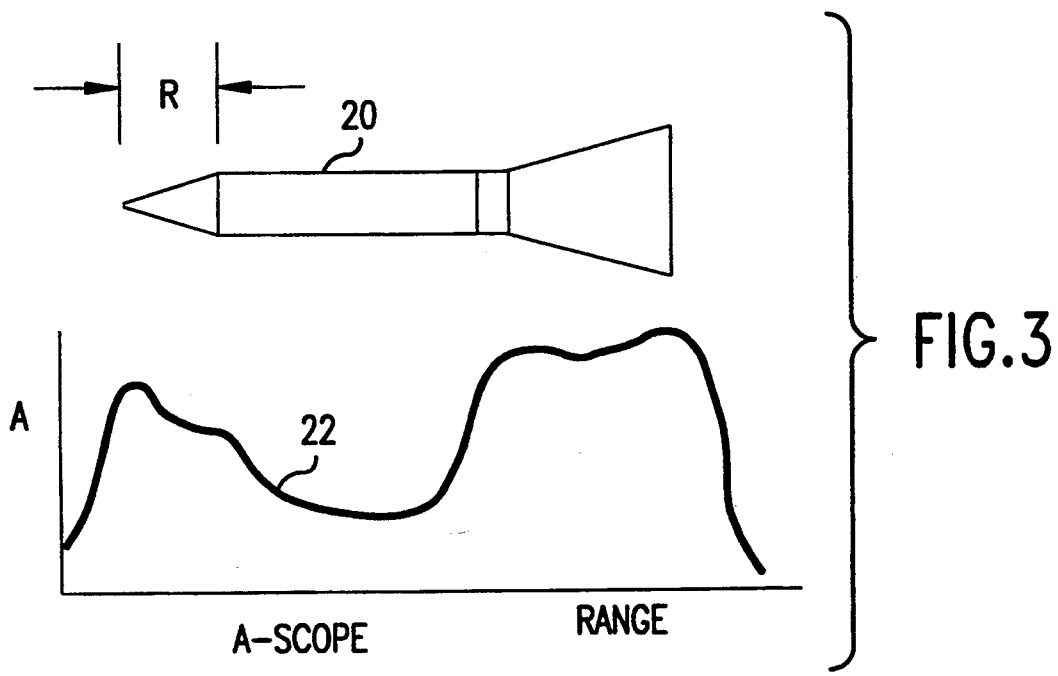
FIG. 3 illustrates graphically an A-scope display of a radar echo reflected from one type of missile structure, as example, useful in explaining the operation of the invention.
Figure 4:
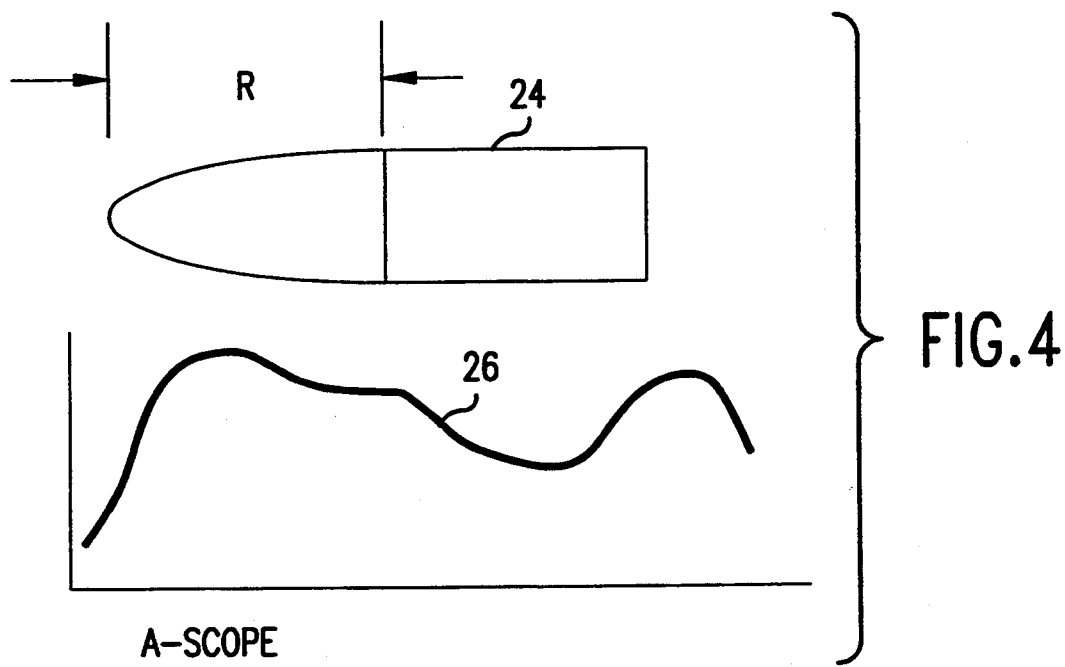
FIG. 4 graphically illustrates another A-scope display of radar echo reflected by a missile of different construction.

In operation, an A-scope presentation of the target, which depicts amplitude of the returned radar signals against time, is observed and recorded in temporary memory 6 as the time of intercept nears. The particular A-scope pattern displayed depends upon the structure of the target. As example, FIGS. 3 and 4 illustrate two patterns presented on the A-scope display by two differently shaped targets. In FIG. 3 the missile 20 contains sharply defined sections and returns a radar echo that varies in amplitude as a function of range in the manner illustrated by the curve 22. In FIG. 4, missile 24 is smoothly rounded in shape, resembling a cigar, and the radar echo returned illustrated by curve 26 varies in amplitude as illustrated and differs from the corresponding display of FIG. 3. The A-scope display has an expanded display in which the scope's sweep is essentially commensurate with the width of the returned radar echo pulse, permitting one to view the changes occuring over a seemingly infinitessimal increment of range.

Much like the library of sound spectra compiled over the years by the submarine service to identify fish and underwater craft, to the degree of sophistication that particular enemy submarines may be identified from their sound emissions, the present invention contemplates the compilation of a library of A-scope presentations associated with different missiles, both friendly and unfriendly to assist in application of the invention. When the type of missile is known, the A-scope pattern can identify the missile's orientation toward the radar. There are of course other known techniques that allow radars to determine a missile's orientation, such as by imaging the target as further example, which also may be here used.

When an interceptor approaches the target, the A-scope pattern changes, excepting the exceptional case when the interceptor strikes the front end of the target where the pattern either does not change or changes in another manner due to "shadowing", which is caused by the blocking of radar energy that would otherwise strike the target. The way in which the displayed pattern changes indicates the location on the missile at which the intercept is made, i.e. the position on the targeted missile where the interceptor struck.

Alternatively, the presence of common range reflections or interference lobes indicates that the front end of the target was not hit in the circumstance in which the target missile is oriented facing the radar instead of traveling skew thereto. The presence of interference lobes due to vector combination of echoes from target and interceptor indicates that at least a part of both bodies are at the same range. As example reference is made to FIG. 5.

When the target and interceptor appear at an overlapping range from the radar but have not yet collided, the components of the echo will undergo vector addition and subtraction as illustrated in FIG. 5. Trace A in FIG. 5 shows the case for no overlap. As target and interceptor approach each other their echoes will overlap in range as shown in Trace B. The overlapping portion of the echoes is illustrated. Because of mutual interference, the echo will be irregular. This irregularity is shown in the center of trace B, and is more pronounced in trace C which is trace B less the sum of the target and interceptor patterns properly adjusted in time. The appearance of a ragged trace as in trace C, without an impact cloud, indicates that no collision has yet taken place. The location of the doubly-reflected echo, also shown in FIG. 5, indicates the separation of bodies.

When the interceptor collides with the target, among other effects, the bodies are distorted by the impact, before the shock wave travels the length of the bodies. This distortion is greatest near the point of impact, increasing the radar cross section even more at that point. The collision creates debris, fragments breaking apart from each body, and a cloud of molten and ionized material resulting from the conversion of kinetic energy to heat. The cloud has a large ephemeral radar cross section. The point on the target that is first hit thus increases in cross section and produces a large increase in the A-scope pattern of the missile at the point of impact.

Figure 6:
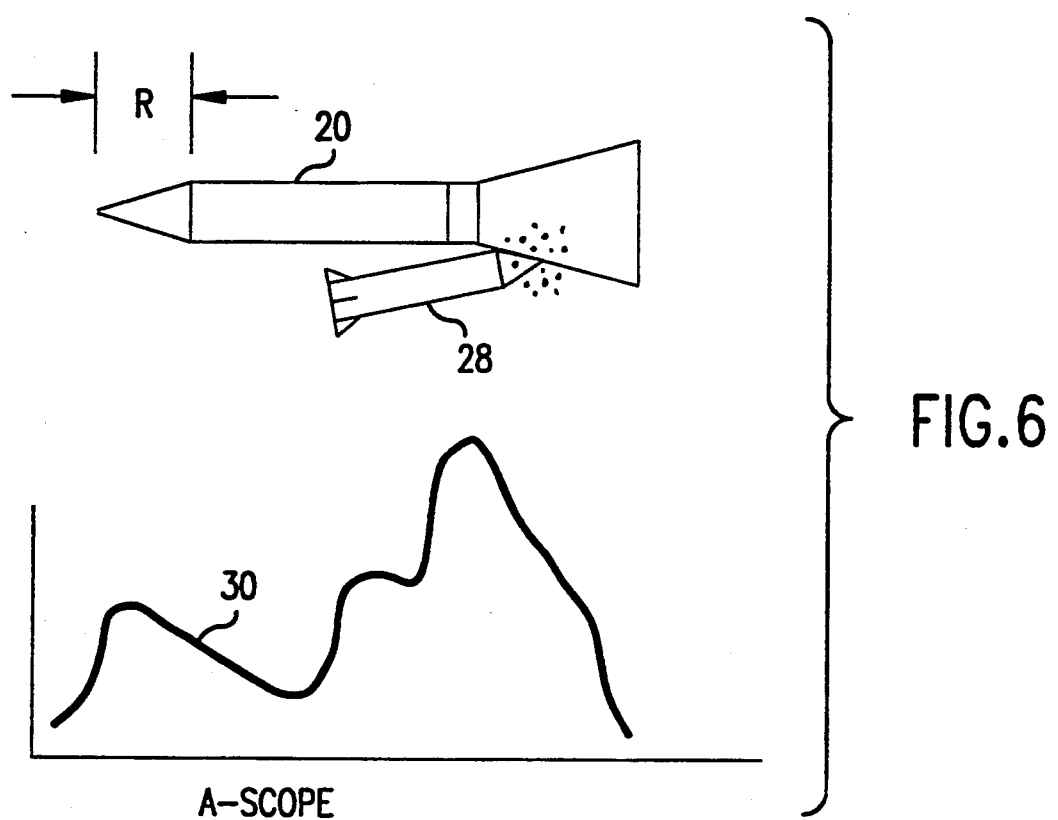
FIG. 6 depicts an A-scope display presented at the time of impact between an interceptor and a missile.

As example, FIG. 6 illustrates a received A-scope pattern at the time of impact when anti-missile missile or interceptor 28, depicted in the figure, strikes the target missile 20 in the rear or aft section. The cloud then quickly grows in diameter and the A-scope presentation changes further, such as illustrated by curve 30. In as much as the radar has a very high pulse repetition rate, this rapidly changing sequence of events and rapid expansion of the cloud's size, typically occurring in a matter of milliseconds, is observed by the radar and displayed on the A-scope.

Different A-scope patterns are produced when the interceptor approaches, hits, or just misses the target. In the preferred form of the present invention, computer 4 in controller 3 processes the received A-Scope patterns according to program algorithms 12, to better reveal a hit or a miss and the point of impact; this information is obscured by the usual unprocessed A-Scope pattern.

Each displayed pattern is temporarily stored in the associated memory, 6, suitably a semiconductor memory, undergoes a subtraction process prescribed by the algorithm, and is then displayed as a modified or subtracted or processed pattern, as variously described.

As one example, one-fourth the sum of the previous four patterns may be subtracted from the most recent pattern to provide the processed pattern, and this subtraction process is continued for each pattern received and repeated continuously. As further example an alternative algorithm could require the subtraction of the sum of the average patterns of the two bodies taken well before the time of intercept, or the computer could just subtract the one immediately preceding pattern to provide the processed pattern. Other particular algorithms for this processing can be substituted. The optimum algorithm will depend upon the missile, interceptor, and radar parameters such as PRF and pulse repetition frequency, which is left to future researchers who are guided by experience with the system.

It should be noted that the patterns are temporarily stored in the memory on a first in first out basis effectively defining a temporary database containing digital information describing the traces; the memory stores the requisite number of patterns in serial order; and, when the next pattern is received as would overflow the memory, the first pattern in that serial order is removed from the memory and discarded.

The patterns or traces resulting from the foregoing subtraction process are referred to as processed echoes. In addition to these two traces, a cross-polarized return may also be shown. Examples of the subtracted patterns are shown in FIGS. 7 and 8 to which reference is made.

Figure 7A:
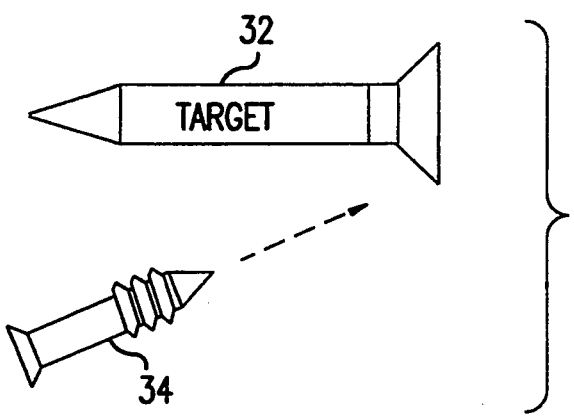
FIGS. 7(a) through (d) show the location of a double reflection echo on an A-scope display occurring with the interceptor and target missile oriented as illustrated and closing and a processed echo resulting from the subtracting process used in the preferred embodiment.
Figure 7B:
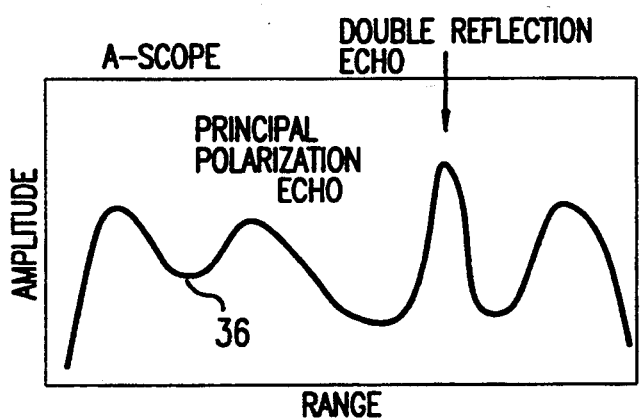
Figure 7C:
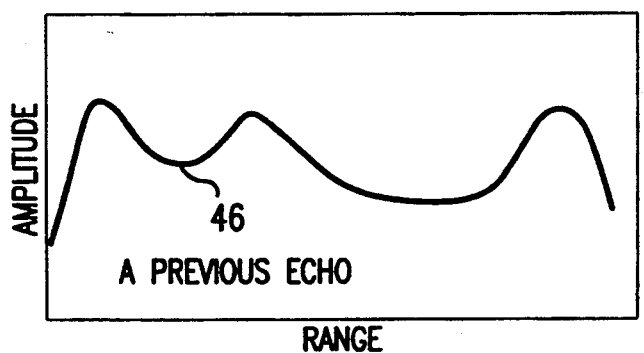
Figure 7D:
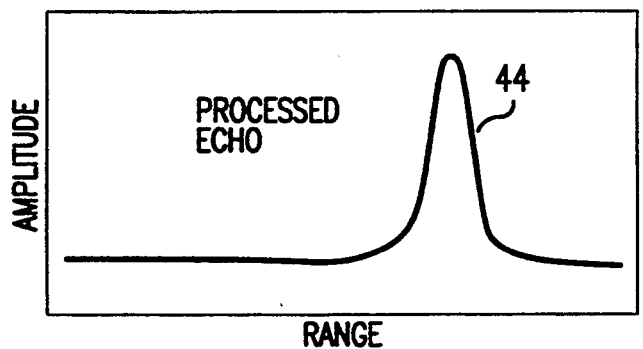

Thus, FIG. 7 (b), illustrates the principal A-scope trace of an interceptor and target showing the location of a double reflection echo in trace 36, occuring with the interceptor and target missile oriented as illustrated in FIG. 7(a) and closing; FIG. 7(c) illustrates an A-scope display trace 46 of the previous echo received prior to that displayed in FIG. 7(b) and FIG. 7(d) illustrates a "processed echo", trace 44, one which is the difference of successive traces, subtracting trace 46 of FIG. 7(c) from trace 36 of FIG. 7(a). The foregoing traces are displayed on separate A-scope displays, controller 3 in FIG. 1 consecutively switching the receiver's output to the separate displays in accordance with conventional technique.

Figure 8A:
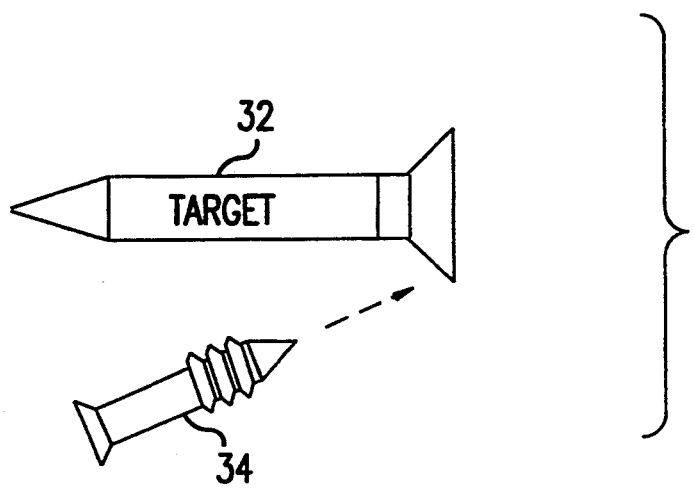
FIG. 8 shows the location of a double reflection echo on the A-scope display, using both the unmodified and processed echoes, with the interceptor and target missile oriented as illustrated and in closer proximity than as illustrated in FIG. 7 and with multiple traces simultaneously displayed on the same A-scope.
Figure 8B:
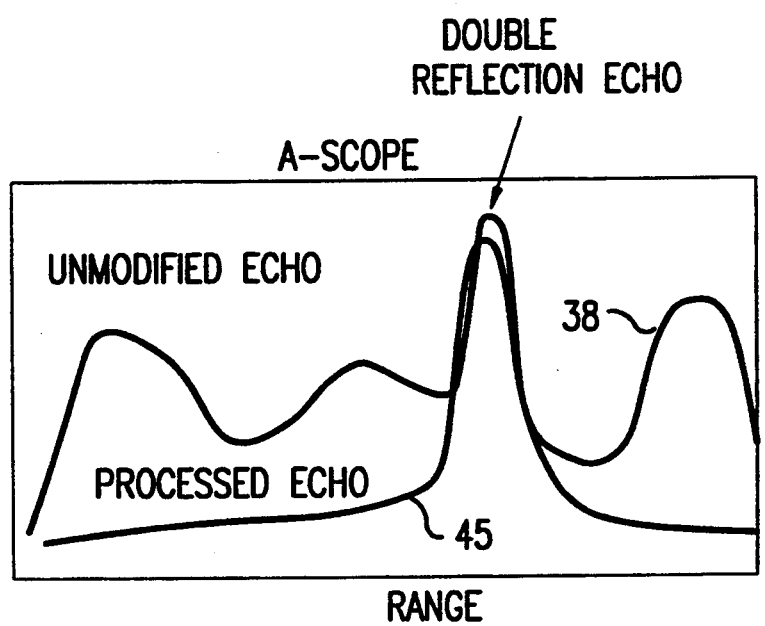
Figure 9A:
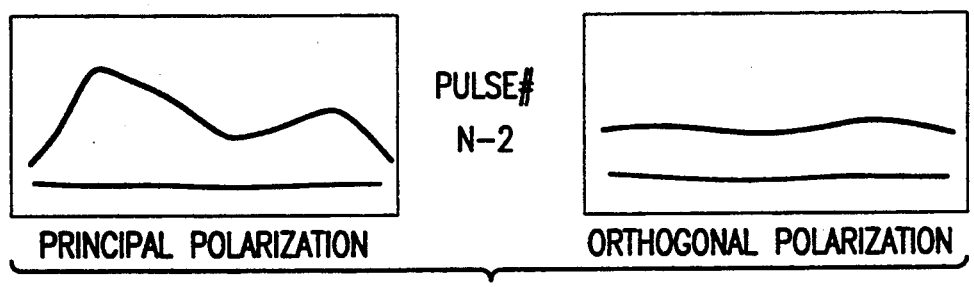
FIG. 9 illustrates examples of four successive A-Scope presentations of principal polarization echoes and the cross polarization echoes in both unprocessed and processed form.

FIG. 8(b) shows the location of a double reflection echo on the A-scope display with the interceptor and target missile oriented as illustrated in FIG. 8(a) and in closer proximity to one another than was illustrated in FIG. 7(a). Trace 38 represents the unmodified echo while trace 45 represents the processed echo. A-Scope traces 38 and 45 in this figure are simultaneously displayed on the same A-Scope, accomplished by conventional technique as by retaining the information in the display's associated video memory, not illustrated, and updating that information with the additional pattern information received, in contrast with the separate A-Scopes in FIG. 7;

Another example of A-scope presentations of both principle polarization pulses and cross or, as variously termed, orthogonal polarization pulses monitored and received by the radar receiver, is illustrated in FIGS. 9a) through (d). These figures show an example of four successive A-Scope presentations in each column, with the initial display occuring in time, labeled N−2, at the top and the last, labeled N+1, at the bottom of the column. The principal polarization signals being received are located on the left column and the cross polarization signals being received are located on the right. In this figure two A-Scopes are used for the display, one on the left column and another on the right, but all four traces could be on one display screen if desired.

Two traces are shown on each presentation; the unprocessed echo is located on the top in the figure, and the difference or processed echo on bottom. The difference echo is the current unprocessed trace less the mean of the previous four traces. In real time these successive traces would flash by on the A-scope very rapidly, but, by suitably programming the processor, they could be replayed slowly, as an alternative, much like the replay during a football game on television.

Figure 9B:
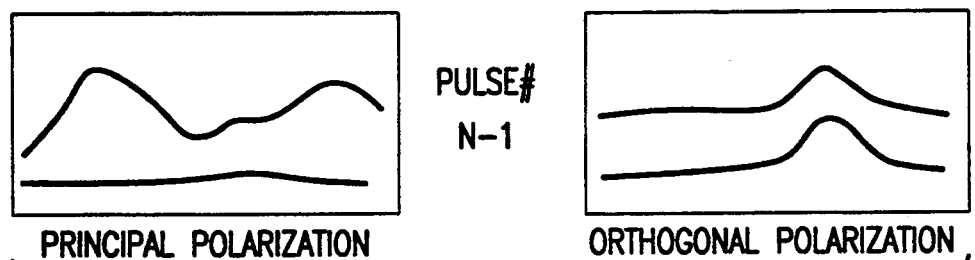
Figure 9C:
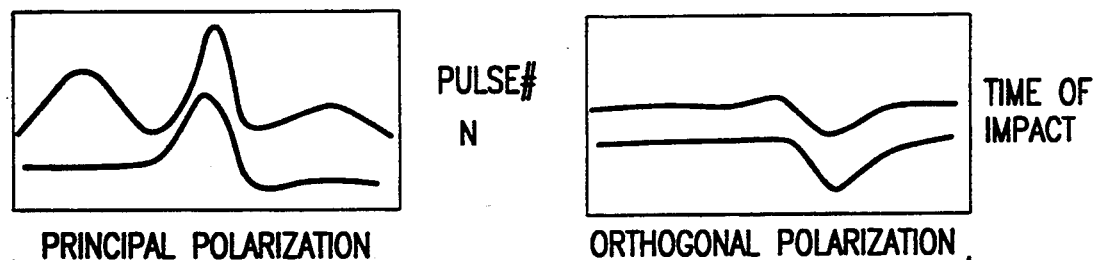
Figure 9D:
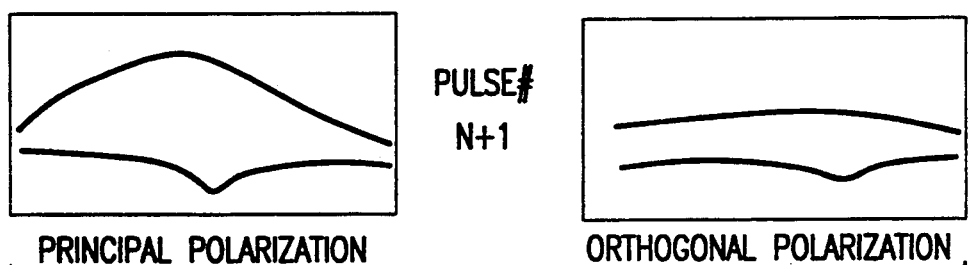

The N−1 pulse, FIG. 9(b), which represents the display occuring just prior to the time of impact between the interceptor and target, in the left principal polarization column, shows a double reflection which is more prominently shown in the underlying difference pattern. That double reflection is even more prominently shown in the cross polarized difference pattern to the right in the adjacent column. The impact flash is prominently shown in the difference pattern of Pulse N, FIG. 9(c). Pulse N+1 in FIG. 9(d) occurred after the impact cloud expanded and obscured details.

The length of the returned signal as displayed on the A-scope correlates to the length of the target missile. Just prior to impact multiple radar reflections occur, creating an echo as represented in FIGS. 7 and 8. In FIG. 7 the targeted missile 32 and interceptor 34 are in close proximity closing upon one another with the orientation illustrated. In that alignment the returned echo displayed on the A-scope appears as curve 36, the curve being aligned with the respective missiles in this illustration for clarity. As the interceptor has moved closer to the targeted missile 32, as illustrated in FIG. 8, the amplitude variation in the reflected echo, represented by curve 38, is changed from that presented in FIG. 7. In each instance a new peak in the curve means close proximity of two bodies with the point of potential impact nearer the radar than the peak, and this is more apparent in the difference patterns 44 and 45. The position of the echo quickly moves to the point of impact as the two bodies close for the collision. Since the extent of the curve represents the length of the target missile, the position of the peak along that curve provides a measure of the location on the missile's body in which the latter is struck by the interceptor. Where a near miss occurs, the location of the double-bounce echo is, of course, representative of the miss distance. Also the amplitude of the double echo is roughly indicative of the miss distance.

The A-Scope patterns will be better viewed from memory just after intercept. Alternatively, they need not be viewed at all by the operator, but are input by the computer, 4, to neural network 14. The preferred method of hit determination for this invention is with the assistance of a neural network 14, as was illustrated generally in FIG. 1 to which reference is again made. The neural network is recognized as a known form of trainable decision making tool that has become available in recent years. In this preferred embodiment the neural network is implemented in computer software, and that network would be used in addition to an experienced operator.

As inputs, the neural network would have many, if not all, of the variables described in this description which are supplied by computer 4, including, perhaps, all the A-Scope patterns with the difference patterns, the radar parameters, the operator's best guess as to type of missile, supplied via keyboard 8, the type of interceptor, the presence and location of the double echo, and the spectrographic information. After the neural network was "trained" by actual live firings on test ranges and/or by live firings during a war, the network should more quickly provide information on the impact point and also on the type of warhead. The neural network provides such information to the computer 4 and the computer displays that information in more user friendly form, as example, on the associated computer display 10 and may also alert the operator by triggering an alarm annunciator.

Briefly referencing FIG. 1 again, at the time the radar switches to the intercept mode, the controller also activates the telescope 17 and the recording spectrograph, as represented in FIG. 1 by block 19, allowing visual imaging of the scene that is converted into its component spectral lines as continuously recorded on the spectrograph. The foregoing spectrograph recorder is maintained active for a short period during the intercept time, perhaps two seconds.

The spectrograph records the characteristic emission lines of the selected elements that have been preselected, as example those associated with known munitions chemicals. Those elements emit such spectra only when excited and vaporized, such as would occur when kinetic energy dissipates as heat resulting from an intercept. That spectograph information may be assessed by a trained operator with access to a printed library of spectral emission characteristics for known materials to identify the particular spectral lines observed.

In a more sophisticated alternative to the foregoing, the spectrograph is automated or computerized, incorporating a microcomputer that effectively receives the observed spectral emissions and compares same with those spectra in the associated digital "look up" table of spectra in memory and outputs the result, either on an associated display or printer. Alternatively still, the microcomputer system incorporates the neural network in software that has been trained to make the comparison with information previously placed in memory relating spectral emissions of various materials.

Some interceptors include a large diameter screen or net containing weights that is deployed just prior to impact to increase the likelihood of a kill in the absence of a direct hit by the interceptor's housing. The weights are often steel balls. With the momentum imparted by the interceptors high speed of travel, the impact of just one ball with the warhead is sufficient to kill the target missile. Each impact of a steel ball with the target, shows a sudden increase in the cross section of the returned radar signal as displayed on the A-scope.

Most often missiles carry the warhead at the front end. However in some cases a threatening missile may arrive carrying the warhead at the rear or aft end. In this situation, the tracking radar must have predetermined the location of the warhead by imaging or other means.

The part of the echo due only to multiple reflections can be separated from the total echo by subtracting previous A-scope patterns taken a short period prior to impact from the present one and observing the "cross polarized" return. The equation defining the radar cross section of the multiple reflection is (1) Cross Section $= \sigma_1 \sigma_2 / (4\pi R_s^2)$, where $\sigma_1$ and $\sigma_2$ are the cross sections of the two bodies in the direction in which multiple reflections occurs, and $R_s$ is the separation of the two reflecting points. This multiple reflection cross section can be quite large when $R_s$ is small and when $\sigma_1 \sigma_2$ is large, but decreases rapidly when $R_s$ increases. When the axis of the two reflectors are at right angles or when the body surfaces are rough in texture, $\sigma_1 \sigma_2$ can be large.

Thus, by roughening the surface of the interceptor, the return radar signal due to multiple reflections is increased, a technique which thereby enhances the present invention. As an additional feature, the interceptor can be roughened in ways that dramatically increase the multiple reflection cross section.

Figure 10:
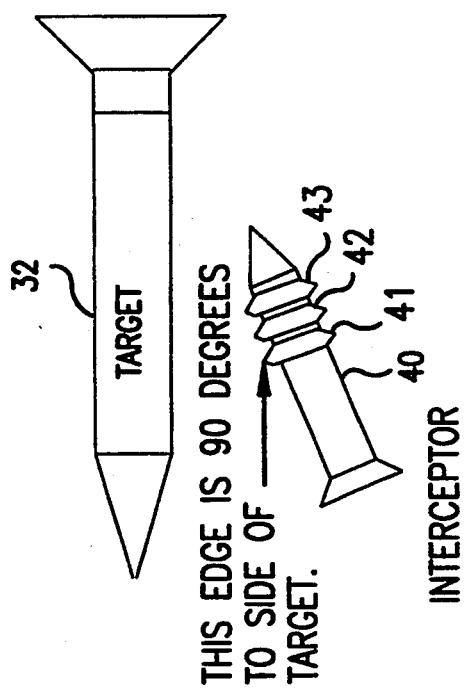
FIG. 10 pictorially illustrates an interceptor containing radar reflection enhancing collars.
Figure 11:
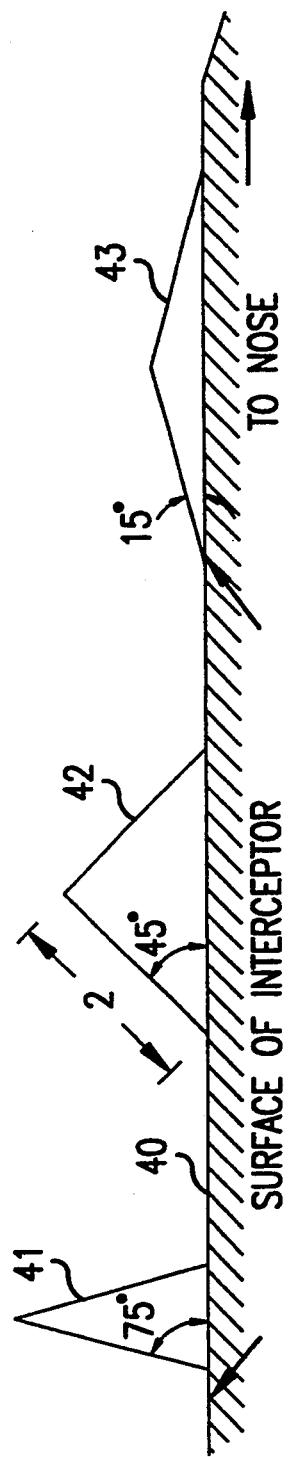
FIG. 11 is a partial section view, showing the radar reflection enhancing collars of FIG. 10 in an enlarged scale.

One manner of surface roughening is illustrated in FIG. 10 which pictorially illustrates interceptor 40 approaching targeted missile 32. The surface of interceptor 40 is roughened by incorporating a series of jagged panels 41, 42 and 43, each with a different angle, adjacent to one another, each circumscribing or collaring the body of the interceptor. The double reflection is strongest when a panel on the interceptor is oriented at a right angle to a panel on the target. As illustrated the jagged panels form ridges, that in cross section are triangles, each with a different angle. As illustrated in the partial section view of FIG. 11, which is drawn to a larger scale, the beamwidth of a ridge is about 30 degrees and angles of 15 degrees, 45 degrees and 75 degrees to the surface of the interceptor ensure that at least one of the three ridges has a surface that is oriented within 15 degrees of being perpendicular to the side of the target 32, irrespective of the orientation of interceptor 40.

The panels 41, 42, and 43, preferably, are adjustable, allowing the angles to be adjusted before launch, on a case by case basis, to correspond with the anticipated angle of impact with the target missile to better ensure observable multiple reflections.

An alternative technique of applying roughening is to add a semicircular torus near the nose of the interceptor co-axial with and extending about the periphery of the interceptor. The radius of the semicircle should be about five wavelengths at the frequency of the radar signals.

The double reflection cross section decreases with target separation. When there is no intercept or collision, the miss distance is indicated by the delayed doubly reflected echo, assuming the radar system possesses sufficient sensitivity to observe the echo.

Figure 12:
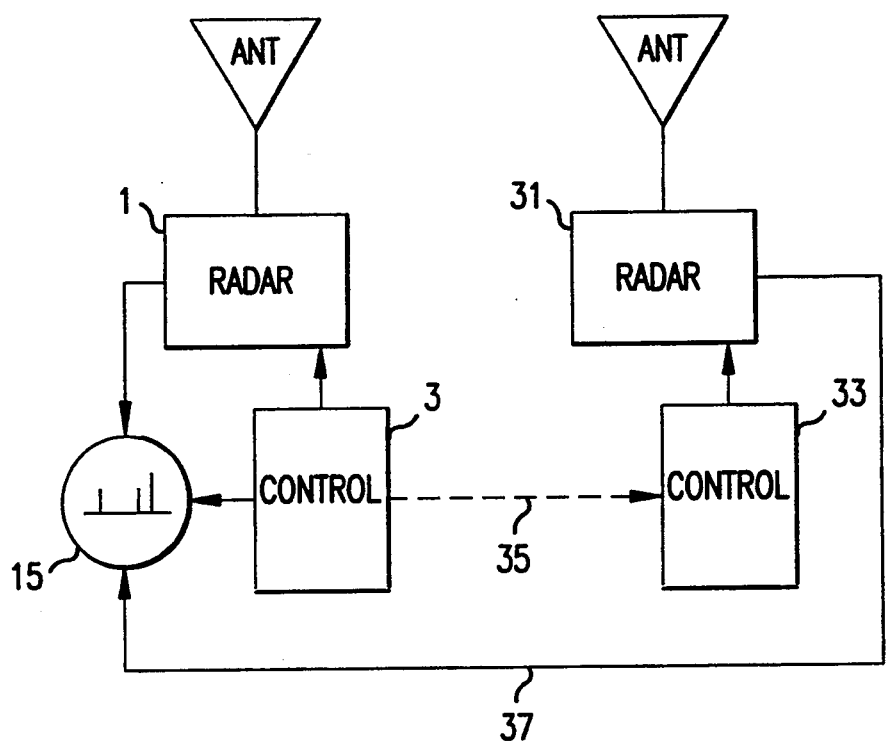
FIG. 12 is a block diagram of an embodiment of the invention that contains two radars.

The foregoing system is further enhanced by the addition of a second radar that is essentially identical to the first but is placed at a remote location, such as generally represented in the block diagram of FIG. 12. As shown radar system 31 is essentially the same construction as radar system 1, earlier described in connection with FIG. 1. The radar systems controller 33, however, may be synchronized with the controller 3, as indicated by dash line 35. Synchronization of the two sets is desirable, but not necessary. The two sets could operate independently with voice communication between them.

When the target missile arrives with its axis oriented perpendicular to the radar's line of sight, the point of intercept can only be determined spectrographically from the elements present in the flash, unless the second radar is used. The echo from the target and the double reflected echo is strong even in the circumstance of such perpendicular orientation. However a second radar may be positioned spaced far enough away from the first so that the line of sight of the second radar is not perpendicular to the axis of the target missile. With that the point of collision can be determined notwithstanding the relative orientation between the target missile and the first observing radar.

Figure 13:
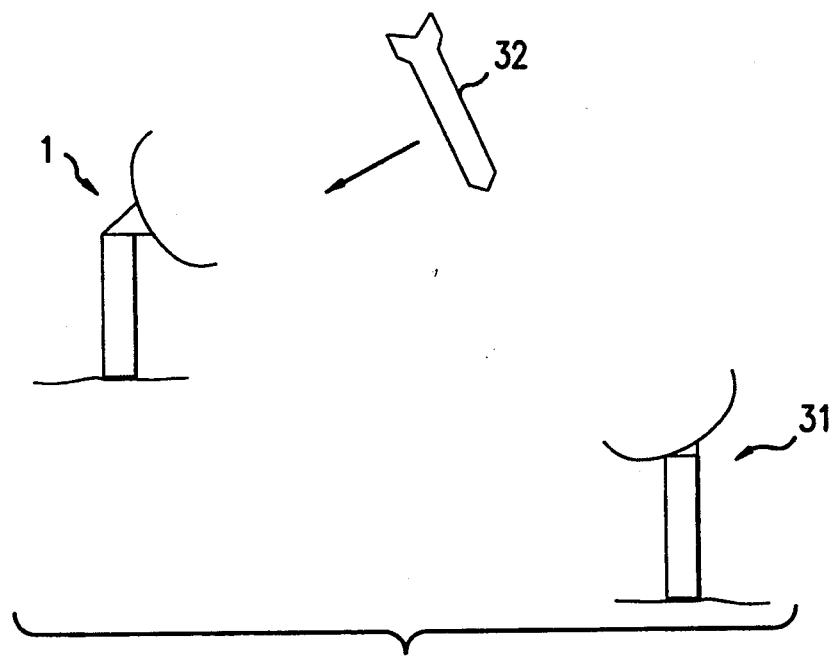
FIG. 13 pictorially illustrates the orientation of an interceptor and target in which the embodiment of FIG. 12 proves useful.

An illustration of a case requiring a second radar to determine the impact point is illustrated in FIG. 13. In the unlikely event illustrated in the figure, Radar 1 cannot determine the point of contact, but it is possible to do so with Radar 31. The axis of the missile cannot be perpendicular to both radars simultaneously when the radars are separated. It is apparent that the cost of a system that incorporates an additional radar is much higher than a basic system and although preferred from the scientific standpoint is less preferred economically.

Aircraft collisions could be avoided by using a ground radar as described herein that monitors the doubly-reflected echo. A radar having a 500 KW transmitter and a 10 square meter antenna could warn of impending collisions within about a 15 mile radius of the radar set. A radar with greater sensitivity could warn over a larger radius. If the radar were required to search rather than being directed to aircraft targets, a broader beam such as a three square meter antenna and higher power such as 6 MW would be better suited to the task.

A collision-avoidance radar would continually search for aircraft within a few miles of each other by monitoring double-reflected echoes. For most targets these echoes will be strong in the cross polarized channel. Whenever such an echo was detected, an immediate alarm would be sent to the two aircraft. For this application the subtraction scheme would not be necessary and may be omitted because only the detection of the doubly-reflected echo and not the point of contact is of importance to that function. Very high resolution also would not be required. However, the radar would require relatively high power and high sensitivity.

The foregoing method for hit detection employs a high range resolution radar. Radar range resolution depends on the bandwidth of the waveform transmitted. Expressed in time units, resolution is 1/B, where B is the bandwidth in Hertz; expressed in meters, resolution is c/2B, where c is the propagation velocity of the radar signal in meters per second. As example, for a resolution of one meter, and c equal to about $3 \times 10^8$ meters per second, the bandwidth should be 150 MHz, a bandwidth well within the state of present radar practice.

Waveform bandwidth is approximately the reciprocal of the pulse length for a CW pulse. CW means that over the duration of a pulse only a single frequency is continuously transmitted. A seven nanosecond, 0.007 microseconds, pulse thus would have about a 150 MHz bandwidth. A much longer pulse chirped over 150 MHz would also have a 150 MHz bandwidth and would be the preferred waveform. The radar receiver is at least of the same bandwidth, which is the conventional practice. However, where higher equipment costs are acceptable, the receiver ideally should be of a bandwidth of about three times as great as the bandwidth defined by the transmitted radar pulses, which permits the display of interference earlier illustrated in FIG. 5 with greater clarity of resolution.

It is appreciated that the foregoing method uses information gathered in the few milliseconds preceding and the few milliseconds of time succeeding an intercept or collision. The method does not depend upon and contrasts with the present technique of radar acquisition and tracking of the largest fragment in the debris. The method determines the location on the missile where the interceptor struck and it determines the chemical elements present in the flash of light resulting from the explosion.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. Apparatus for assessing the effectiveness of an interception of a targeted incoming missile by a launched intercepting anti-missile, comprising:

a dual mode radar system for detecting and tracking moving craft, said radar system having a tracking mode and an intercept mode for transmitting RF pulses at a high pulse repetition frequency during said intercept mode and a lesser pulse repetition frequency during said tracking mode; said radar system further including:

antenna means for radiating said radar pulses into space, whereby said radar pulses may be incident upon one or more craft moving through such space;

broad band receiver means for receiving radar echo pulses reflected from any such moving craft, said broad band receiver means having a band width at least as large as the bandwith of said RF pulses being transmitted during said intercept mode;

controller means, said controller means including:

range determining means, responsive to radar echo pulses received by said receiver, for determining the distance between the site of said radar transmitter and each craft detected; and collision prediction means, responsive to radar echo pulses received by said receiver, for determining the intercraft distance between any two such craft that are simultaneously detected and whether said intercraft distance is decreasing; and mode switching means for switching said transmitting means from said tracking mode into said intercept mode, responsive to said collision predicting means detecting an inter craft distance of less than a predetermined minimum distance;

display means, coupled to said receiver means and said controller means, for displaying a sequence of A-scope presentation traces of the amplitude of radar echo signals reflected from two crafts while in close proximity and closing upon one another to a collision there between or avoidance of collision, during the period in which said transmitting means is in said intercept mode, to provide a trace representative of the length of at least one of said craft representing the targeted incoming missile and whereby an amplitude variation occuring in such trace represents the location on craft at which collision occured.

2. The invention as defined in claim 1, wherein said controller means further includes:
    memory means for temporarily recording a predetermined plurality of said A-Scope presentation traces in sequence to provide a temporary database of said traces, said memory means serially sequencing said traces into memory on a first in first out basis wherein the number of said traces in memory does not exceed said predetermined plurality in number;
    computer means and program algorithm means associated with said digital processor means for processing the last A-scope display trace entered within said temporary database in accordance with said program algorithm means to produce a processed display trace and for supplying said processed display trace to said display means for display, whereby any amplitude variation in the last received trace is enhanced for greater visual effect.

3. The invention as defined in claim 2, wherein said algorithm means includes:
    means for selecting the most recent trace from said database as a minuend;
    means for selecting another of said traces from said database as a subtrahend;
    subtraction means for subtracting said subtrahend trace from said minuend trace to produce a difference trace;
    and means for supplying said difference trace to said display means for displaying said difference trace.

4. The invention as as defined in claim 3, wherein said means for selecting another of said traces from said database as a subtrahend comprises: means for selecting the next most recent trace from said temporary database.

5. The invention as defined in claim 2, wherein said algorithm means includes:
    means for selecting the last trace from said database as a minuend;
    means for determining the mathematical mean of the remaining traces in said databases and selecting said mathematical mean as a subtrahend;
    subtraction means for subtracting said subtrahend trace from said minuend trace to produce a difference trace;
    and means for supplying said difference trace to said A-scope display for displaying said difference trace.

6. The invention as defined in claim 2, wherein said display means comprises a plurality of A-scope displays.

7. The invention as defined in claim 2, wherein said display means comprises an A-scope display.

8. The invention as defined in claim 2, wherein said computer means includes:
    means for determining the mathematical mean of a selected number of the most recent previous patterns stored in memory;
    subtraction means for subtracting from the last recorded pattern either the previous pattern or the mathematical mean of a selected number of previous patterns to produce a subtracted pattern, and means for outputting said subtracted pattern for display on said display means, whereby said subtracted pattern is displayed either as an additional trace on an A-Scope that also displays said most recent pattern or on another A-Scope display separate from the one displaying said most recent pattern.

9. The invention as defined in claim 2, wherein said computer means further includes: means for interpreting the processed traces to determine the occurance of a collision between such craft and the location on such craft of such collision.

10. The invention as defined in claim 9, wherein said means for interpreting the processed traces includes:
    neural network program means for determining the distance along one of said two craft where a collision occurs.

11. The invention as defined in claim 1, wherein said transmitter means emits radar RF pulses at a pulse repetition rate of between 10,000 to 40,000 pulses per second and with a pulse width on the order of ten microseconds, and having a bandwidth of between 100 MHz and 400 MHz.

12. The invention as defined in claim 1, wherein said receiver means is of a band width no less than three times as great as the bandwidth of said radar pulses.

13. The invention as defined in claim 1, further comprising:
    telescope means, said telescope means being linked to said antenna means for viewing the space being tracked by said radar system; and
    spectroscope means coupled to said telescope means, said spectroscope means being programmed to determine the presence of specified emission lines in the ultraviolet and visible spectrum.

14. The invention as defined in claim 13, further comprising:
    recorder means for recording the spectral lines detected by said spectroscope means; and
    means for activating said recorder means responsive to said radar system being in said intercept mode.

15. The invention as defined in claim 13, wherein said spectroscope means further comprises:
    a spectroscope;
    means to gate the spectroscope to the operating condition, responsive to said transmitter means being in said intercept mode, to receive a spectrum of light energy generated by a conflagration;
    means for displaying and recording the received spectra;
    library data base means containing a catalogue of spectral lines and the munitions materials characterized by said spectral lines; and
    means for comparing said recorded spectrum with spectral lines in said library to determine the existence of any matches; and
    means for displaying the list of munitions materials in said library whose spectral characteristics match those spectral characteristics of the received spectrum.

16. The invention as defined in claim 1, further comprising: reflection enhancing means carried by at least one of said craft to enhance reflection of incident RF pulses from said radar tranmitter means.

17. The invention as defined in claim 16, wherein said reflection enhancing means further comprises: a semicircular torus, said semicircle having a cross section approximately equal to five wavelengths at the frequency of said radar signals, said torus being located adjacent to the front end of the missile coaxial with and surrounding the interceptor body.

18. The invention as defined in claim 16, wherein said reflection enhancing means further comprises:

a series of collars, said collars being spaced along the axis of said interceptor and collaring said interceptor, each said collar having a triangle shaped cross section, each said triangle having an apex angle, the apex angle of one said triangle being substantially different from the corresponding angle of the remaining collars to thereby increase the chance that at least one of said side panels of said collars is oriented substantially perpendicular to the surface of said target missile.

19. Apparatus for assessing the effectiveness of an interception of a targeted incoming missile by a launched intercepting anti-missile, comprising:

a dual mode radar system for detecting and tracking moving craft, said radar system having a tracking mode and an intercept mode for transmitting RF pulses at a high pulse repetition frequency during said intercept mode and a lesser pulse repetition frequency during said tracking mode; said radar system further including:

antenna means for radiating said radar pulses into space, whereby said radar pulses may be incident upon one or more craft moving through such space;

broad band receiver means for receiving radar echo pulses reflected from any such moving craft, said broad band receiver means having a band width at least as large as the bandwith of said RF pulses being transmitted during said intercept mode;

controller means, said controller means including:

range determining means, responsive to radar echo pulses received by said receiver, for determining the distance between the site of said radar transmitter and each craft detected; and collision prediction means, responsive to radar echo pulses received by said receiver, for determining the intercraft distance between any two such craft that are simultaneously detected and whether said intercraft distance is decreasing;

mode switching means for switching said transmitting means from said tracking mode into said intercept mode, responsive to said collision predicting means detecting an inter craft distance of less than a predetermined minimum distance; and memory means for receiving in sequence a predetermined plurality of successive frames of information, each frame of information being descriptive of the amplitude of radar echo signals reflected from two crafts while in close proximity to and closing upon one another through to collision there between or avoidance of collision, during the period in which said transmitting means is in said intercept mode, to thereby provide a temporary database, said memory means serially sequencing said frames into memory on a first in first out basis wherein the number of said traces in memory does not exceed said predetermined plurality in number;

neural network means to determined from said frames of information in said temporary database the location on one of said craft at which a collision occured between said craft; and display means for displaying the information determined by said neural network means.

20. Apparatus for assessing the effectiveness of an interception of a targeted incoming missile by a launched intercepting anti-missile, comprising in a mode switching radar system:

an A-scope display for presenting a display of the amplitude variation as against range of a radar echo, said radar echo comprising a composite of a radar echo reflected from an anti-missile missile and another radar echo reflected from an incoming missile targeted for destruction by said anti-missile missile, with said anti-missile missile and said incoming missile closing upon one another, wherein said respective radar echoes overlap in time at said mode switching radar system.

21. The invention as defined in claim 20, wherein said mode switching radar system emits radar pulses at a pulse repetition rate of between 10,000 to 40,000 pulses per second and that have a pulse width on the order of ten microseconds and are of a bandwidth of between 100 MHz and 400 MHz.

22. The invention as defined in claim 20, further comprising:

telescope means and spectrograph means coupled to said telescope means for determining the spectral lines of light received at said radar system emitted from said anti-missile missile and said targeted missile as a consequence of a collision therebetween.

23. The method of assessing the effectiveness of an interceptor's interception of a targeted incoming missile, which includes the steps of:

illuminating the interceptor and the target missile with broadband radar pulses at a high pulse repetition frequency, wherein a double radar echo is returned in response;

receiving and processing the reflected radar echoes;

displaying the reflected radar echoes on an A-scope, whereby the amplitude of the returned signal as a function of time is displayed, for providing an indication of the length of the target and the position therealong of the interceptor approaching the target; and determining from said displayed reflected signal the position along the length of said target missile at which a double reflection, if any, occured.

24. The method as defined in claim 23, wherein the step of determining, includes:

comparing each A-Scope pattern of the most recent radar echo with like A-scope patterns of radar echoes previously received; and identifying the position of any rapid changes in the amplitude of the displayed pattern.

25. The method defined in claim 23, further including the step of:

monitoring the interceptor and target missile for spectral emissions of known munitions materials.

26. The method defined in claim 25 wherein the step of monitoring, includes:

viewing said interceptor and target missile for spectral emissions as would occur in a conflagration resulting from the collision between said interceptor and target missile;

comparing the received spectral emissions with a plurality of spectral emission characteristics of known munitions materials;

displaying a list of munitions materials whose spectral emissions match those of the received spectral lines.

27. The method as defined in claim 25, wherein the step of monitoring includes:

selecting those high intensity spectral emission lines appearing in the flash of conflagration;

comparing said selected spectral emission lines against a library of information on spectral emission lines that are characteristic of known materials; and selecting the identity of the materials whose spectral emissions match those appearing in said flash of conflagration; and outputting information of the identity of the materials selected.

* * * * *